(12) United States Patent
Akita et al.

(10) Patent No.: US 9,453,751 B2
(45) Date of Patent: *Sep. 27, 2016

(54) FUEL CONSUMPTION MEASURING INSTRUMENT

(71) Applicant: HORIBA, Ltd., Kyoto (JP)

(72) Inventors: Masanobu Akita, Kyoto (JP); Hiroshi Nakamura, Kyoto (JP)

(73) Assignee: Horiba, Ltd., Kyoto (JP)

( * ) Notice: Subject to any disclaimer, the term of this patent is extended or adjusted under 35 U.S.C. 154(b) by 179 days.

This patent is subject to a terminal disclaimer.

(21) Appl. No.: 14/282,816

(22) Filed: May 20, 2014

(65) Prior Publication Data

US 2014/0345373 A1    Nov. 27, 2014

(30) Foreign Application Priority Data

May 22, 2013 (JP) .................................. 2013-107690
Aug. 12, 2013 (JP) .................................. 2013-167302

(51) Int. Cl.
  *G01M 15/10*   (2006.01)
  *G01F 9/00*   (2006.01)
  *F01N 13/00*   (2010.01)
  *G01F 1/66*   (2006.01)

(52) U.S. Cl.
  CPC .............. *G01F 9/00* (2013.01); *F01N 13/008* (2013.01); *F01N 2240/20* (2013.01); *F01N 2560/025* (2013.01); *F01N 2560/07* (2013.01); *G01F 1/667* (2013.01)

(58) Field of Classification Search
  CPC .......................... G01M 15/10; F01N 2560/07

USPC ................ 73/114.52, 114.53, 114.69, 114.72
See application file for complete search history.

(56) References Cited

U.S. PATENT DOCUMENTS

| | | | |
|---|---|---|---|
| 3,844,920 A | 10/1974 | Burgett et al. | |
| 2001/0010031 A1 | 7/2001 | Takamoto et al. | |
| 2015/0046101 A1* | 2/2015 | Akita et al. ................... | 702/45 |

FOREIGN PATENT DOCUMENTS

| | | |
|---|---|---|
| JP | 02234021 | 9/1990 |
| WO | 9935480 A | 7/1999 |

OTHER PUBLICATIONS

Akita et al. SAE Int. J. Commer. Veh. Apr. 8, 2013, vol. 6, Issue 1, p. 183-198, "In-Situ Real-Time Fuel Consumption Measurement Using Raw Exhaust Flow Meter and Zirconia AFR Sensor."

(Continued)

*Primary Examiner* — Eric S McCall
(74) *Attorney, Agent, or Firm* — Brooks Kushman P.C.

(57) ABSTRACT

An instrument that directly measures a flow rate and air-fuel ratio of exhaust gas, and from the flow rate and air-fuel ratio of the exhaust gas, calculates fuel consumption measures the fuel consumption at high response speed and with high accuracy. The instrument is provided with: an ultrasonic flowmeter 2 that measures a flow rate QEX of exhaust gas flowing through an exhaust gas flow path R; and an arithmetic unit 4 that calculates fuel consumption Fe of an engine with use of the exhaust gas flow rate QEX obtained by the ultrasonic flowmeter 2 and an air-fuel ratio AFR obtained by an air-fuel ratio sensor 3 that measures the air-fuel ratio AFR of the exhaust gas flowing through the exhaust gas flow path R.

13 Claims, 7 Drawing Sheets

(56) References Cited

OTHER PUBLICATIONS

Akita et al. Society of Automotive Engineers of Japan (JSAE) Annual Congress May 22, 2013, 6 Pages, "Real-time Fuel Consumption Measurement Using Raw Exhaust Flow Meter and Zirconia AFR Sensor."

Akita et al. SAE World Congress Apr. 16-18, 2013, 11 Pages, "In-Situ Real-Time Fuel Consumption Measurement Using Raw Exhaust Flow Meter and Zirconia AFR Sensor."

Horiba LTD, Pacifico Yokohama Exhibition Hall, May 22-24, 2013, 13 Pages, "Automotive Engineering Exposition."

* cited by examiner (1) CONVENTIONAL METHOD (2) PRESENT EMBODIMENT

FUEL CONSUMPTION MEASURING INSTRUMENT

CROSS-REFERENCE TO RELATED APPLICATIONS

This application claims priority to JP Application No. 2013-107690, filed May 22, 2013, and JP Application No. 2013-167302, filed Aug. 12, 2013, the disclosures of which are incorporated in their entirety by reference herein.

TECHNICAL FIELD

The present invention relates to a fuel consumption measuring instrument that measures fuel consumption of an engine.

BACKGROUND ART

The improvement of fuel efficiency is one of important subjects in research and development of a vehicle, and for further improvement, it is important to measure instantaneous fuel consumption related to behavior of an engine.

To instantaneously measure fuel consumption, direct measurement by a fuel flow meter is commonly used. However, in the case of a completed car, the measurement using the fuel flow meter is difficult. Also, it is not easy to, without disturbing any fuel system condition, set up the fuel flow meter in a fuel flow path.

For this reason, for example, a method (carbon balance method) that obtains emission mass from respective exhaust gas component concentrations in exhaust gas diluted by a CVS, and from the emission mass, calculates fuel consumption is used (e.g., JPA-02-234021). The carbon balance method is one that calculates fuel consumption from amounts of carbon contained in respective components of $CO_2$, CO, and HC in exhaust gas.

However, in the case of the method that introduces the diluted exhaust gas diluted by the CVS into an exhaust gas analyzer through a sampling flow path, and measures the component concentrations of $CO_2$, CO, and HC in the exhaust gas, it takes time for the diluted exhaust gas to be introduced into the exhaust gas analyzer through the sampling flow path, and therefore a response delay occurs. For example, measurement of fuel consumption of a vehicle that frequently performs a fuel cut and switching to electrical driving makes a response delay due to gas congestion caused by the sampling flow path particularly noticeable, and therefore may be unsuitable for the instantaneous fuel consumption measurement.

SUMMARY OF INVENTION

Technical Problem

Therefore, the present invention is mainly intended to, by an instrument that directly measures a flow rate of exhaust gas flowing through an exhaust gas flow path and an air-fuel ratio of the exhaust gas, and calculates fuel consumption from the flow rate and air-fuel ratio of the exhaust gas, measure the fuel consumption at high response speed and with high accuracy.

Solution to Problem

That is, the fuel consumption measuring instrument according to the present invention is a fuel consumption measuring instrument that measures fuel consumption of an engine, and provided with: an ultrasonic flowmeter that is provided in an exhaust gas flow path through which exhaust gas emitted from the engine flows, and measures a flow rate of the exhaust gas flowing through the exhaust gas flow path; and an arithmetic unit that is configured to calculate the fuel consumption of the engine with use of the exhaust gas flow rate obtained by the ultrasonic flowmeter, and an air-fuel ratio obtained by an air-fuel ratio sensor that is provided in the exhaust gas flow path and measures the air-fuel ratio of the exhaust gas flowing through the exhaust gas flow path.

If so, the fuel consumption measuring instrument is one that directly measures the flow rate and air-fuel ratio of the exhaust gas flowing through the exhaust gas flow path by the ultrasonic flowmeter and air-fuel ratio sensor, and can eliminate a response delay that has conventionally been caused by providing a sampling flow path. This enables the fuel consumption of the engine to be measured at high response speed and with high accuracy. Also, because of using the ultrasonic flowmeter, pressure loss due to providing the ultrasonic flowmeter is not present; measurement accuracy is high over a range from a small flow rate to a large flow rate; and there is also less influence on pulsation. This also enables the fuel consumption to be measured with high accuracy. Further, because of the direct measurement, a piping configuration can be simplified by eliminating the need for the conventional sampling flow path, and also because a dilution device such as a CVS becomes unnecessary, the measuring instrument can be downsized. In addition, for these reasons, instrument cost can also be reduced.

In the case where the air-fuel ratio sensor is provided on an upstream side of the ultrasonic flowmeter, the air-fuel ratio sensor serves as a resistor to give rise to disturbance in a flow velocity distribution of the exhaust gas, which serves as an error factor of a measured value of the ultrasonic flowmeter. For this reason, desirably, the air-fuel ratio sensor is provided on a downstream side of the ultrasonic flowmeter in the exhaust gas flow path. As described, by providing the air-fuel ratio sensor on the downstream side of the ultrasonic flowmeter, without giving rise to the disturbance in the flow velocity distribution, the exhaust gas flow rate can be accurately measured.

Desirably, on the upstream side of the ultrasonic flowmeter in the exhaust gas flow path, a flow conditioner is provided.

If so, a flow of the exhaust gas flowing into the ultrasonic flowmeter can be straightened by the flow conditioner to eliminate the disturbance in the flow velocity distribution of the exhaust gas flowing into the ultrasonic flowmeter. This enables the exhaust gas flow rate to be accurately measured.

Desirably, the upstream side of the ultrasonic flowmeter in the exhaust gas flow path is formed of a straight pipe, and the straight pipe has a length ten times or more (10D or more) a flow path diameter D of a flow path part where the ultrasonic flowmeter is provided.

As described, the upstream side of the ultrasonic flowmeter is formed of the straight pipe having the length ten times or more the flow path diameter, and therefore the exhaust gas flowing into the ultrasonic sensing point can be more stable.

Desirably, the straight pipe is provided with a heater.

If so, heating can be performed so as to make temperature of the exhaust gas flowing through the straight pipe constant, and therefore moisture contained in the exhaust gas can be prevented from condensing to accurately measure the exhaust gas flow rate by the ultrasonic flowmeter.

Desirably, the air-fuel ratio sensor is a direct insertion type zirconia sensor that is provided with being inserted into the exhaust gas flow path.

If so, fitting the air-fuel sensor into the exhaust gas flow path can be made easy. Also, this sort of sensor is superior in responsiveness, and can also highly accurately measure a rapid change in fuel consumption on an occasion such as before or after a fuel cut at the time of transient cycle running Desirably, the ultrasonic flowmeter and the air-fuel ratio sensor are provided close to each other within a range where the composition of the exhaust gas does not change in the exhaust gas flow path, or within a range where flow rate variations within measurement unit times can be regarded as the same.

As described, by providing the two sensors within a range where a time lag in measurement (measured value) does not occur, measurement accuracy of the fuel consumption can be improved.

Desirably, the fuel consumption measuring instrument is provided with: a housing that is provided with an exhaust gas introduction port and an exhaust gas lead-out port outside; and a measuring flow path that is provided inside the housing and communicatively connected to the respective ports to form the exhaust gas flow path, wherein: the measuring flow path is provided with the ultrasonic flowmeter; and the exhaust gas introduction port or the exhaust gas lead-out port is provided with the air-fuel ratio sensor.

If so, the fuel consumption measuring unit can be unitized to make it easy to handle the fuel consumption measuring instrument. Also, the air-fuel ratio sensor such as the zirconia sensor has a relatively short service life, and therefore, as described, by providing the exhaust gas introduction port or exhaust gas lead-out port outside of the housing with the air-fuel ratio sensor, replacement work can be made easy. Further, as described, by providing the ultrasonic flowmeter inside the housing and providing the air-fuel ratio sensor at any of the ports outside of the housing, the two sensors are consequently provided within a range where the time lag in measurement does not occur, and the composition of the exhaust gas does not change, and therefore the measurement accuracy of the fuel consumption can be improved.

Desirably, the housing is provided with an input part for inputting a setting parameter for the air-fuel ratio sensor, such as an input panel. In addition, the setting parameter is a parameter necessary for the air-fuel ratio measurement, such as a sensor constant.

If so, after the air-fuel ratio sensor has been replaced, the setting parameter necessary to measure the air-fuel ratio can be inputted on site. That is, the replacement work on the air-fuel ratio sensor, and setting parameter input work on the air-fuel ratio sensor can be done at the same place to improve user-friendliness.

Desirably, the exhaust gas introduction port, the exhaust gas lead-out port, and the measuring flow path are formed of a straight pipe member, and the straight pipe member is fitted into the housing through an antivibration mechanism. In addition, as the antivibration mechanism, for example, a mechanism using antivibration rubber is possible.

The straight pipe member is connected to an exhaust pipe of the engine serving as a vibration source, and therefore vibrated by vibration arising from the exhaust pipe. Note that the straight pipe member is fitted into the housing through the antivibration mechanism, so that even in the case where the straight pipe member is vibrated, the vibration is unlikely to be transmitted to the housing, and therefore an influence of the vibration on other devices such as the arithmetic processing unit installed in the housing can be reduced. Also, the straight pipe member is vibrated as a whole in response to the vibration of the exhaust pipe, so that a relative positional relationship between ultrasonic transceivers of the ultrasonic flowmeter provided through the straight pipe member is not changed, and therefore a measurement error of the exhaust gas flow rate can be suppressed.

In addition, in the case where the straight pipe member is fitted into the housing without the antivibration mechanism, the straight pipe member is vibrated by the vibration from the exhaust pipe as well as being applied with a bending moment, and is therefore deformed. In that case, the positional relationship between the ultrasonic transceivers of the ultrasonic flowmeter attached through the straight pipe member is shifted to give rise to a measurement error. Also, the vibration from the exhaust pipe is transmitted to the housing through the straight pipe member, and therefore the influence of the vibration is also exerted on the other devices installed in the housing, such as the arithmetic processing unit.

Desirably, a side wall of the straight pipe member is formed with an insertion hole into which an ultrasonic transceiver of the ultrasonic flowmeter is inserted, and the ultrasonic transceiver is fixed in the insertion hole through an insulating member.

If so, the ultrasonic transceiver and the straight pipe member can be insulated from each other. This enables electrical noise to be prevented from being transmitted from the straight pipe member to the ultrasonic transceiver, and therefore a measurement error due to the electrical noise can be reduced.

In the case where the antivibration mechanism is made of the antivibration rubber, the antivibration rubber fulfills an insulating function between the housing and the straight pipe member, and therefore electrical noise can be prevented from being transmitted from the housing to the ultrasonic transceiver through the straight pipe member to reduce a measurement error due to the electrical noise.

Desirably, the fuel consumption measuring instrument is provided with an exhaust gas analyzer that is configured to analyze a predetermined measuring target component contained in the exhaust gas flowing through the exhaust gas flow path, wherein an operation part of the exhaust gas analyzer or the arithmetic unit is configured to calculate emission mass of the measuring target component with use of component concentration obtained by the exhaust gas analyzer and the exhaust gas flow rate obtained by the ultrasonic flowmeter.

If so, the ultrasonic flowmeter can be used for both of the fuel consumption measurement and the emission mass measurement (mass measurement).

Desirably, the exhaust gas analyzer is configured to measure the measuring target component contained in the exhaust gas flowing on the upstream side of the ultrasonic flowmeter in the exhaust gas flow path.

Also, in the case of a configuration having a sampling pipe that is configured to collect part of the exhaust gas flowing on the upstream side of the ultrasonic flowmeter in the exhaust gas flow path and is configured to introduce the part into the exhaust gas analyzer, desirably, a sampling flow rate of the part flowing through the sampling pipe is used to correct the exhaust gas flow rate obtained by the ultrasonic flowmeter.

Advantageous Effects of Invention

According to the present invention configured as described, by an instrument that, without using a carbon balance method, directly measures a flow rate of exhaust gas flowing through an exhaust gas flow path and an air-fuel ratio of the exhaust gas, and calculates the fuel consumption from the flow rate and air-fuel ratio of the exhaust gas, the fuel consumption can be measured at high response speed and with high accuracy.

DESCRIPTION OF EMBODIMENTS

In the following, a fuel consumption measuring instrument according to the present invention is described with reference to the drawings.

Figure 1:
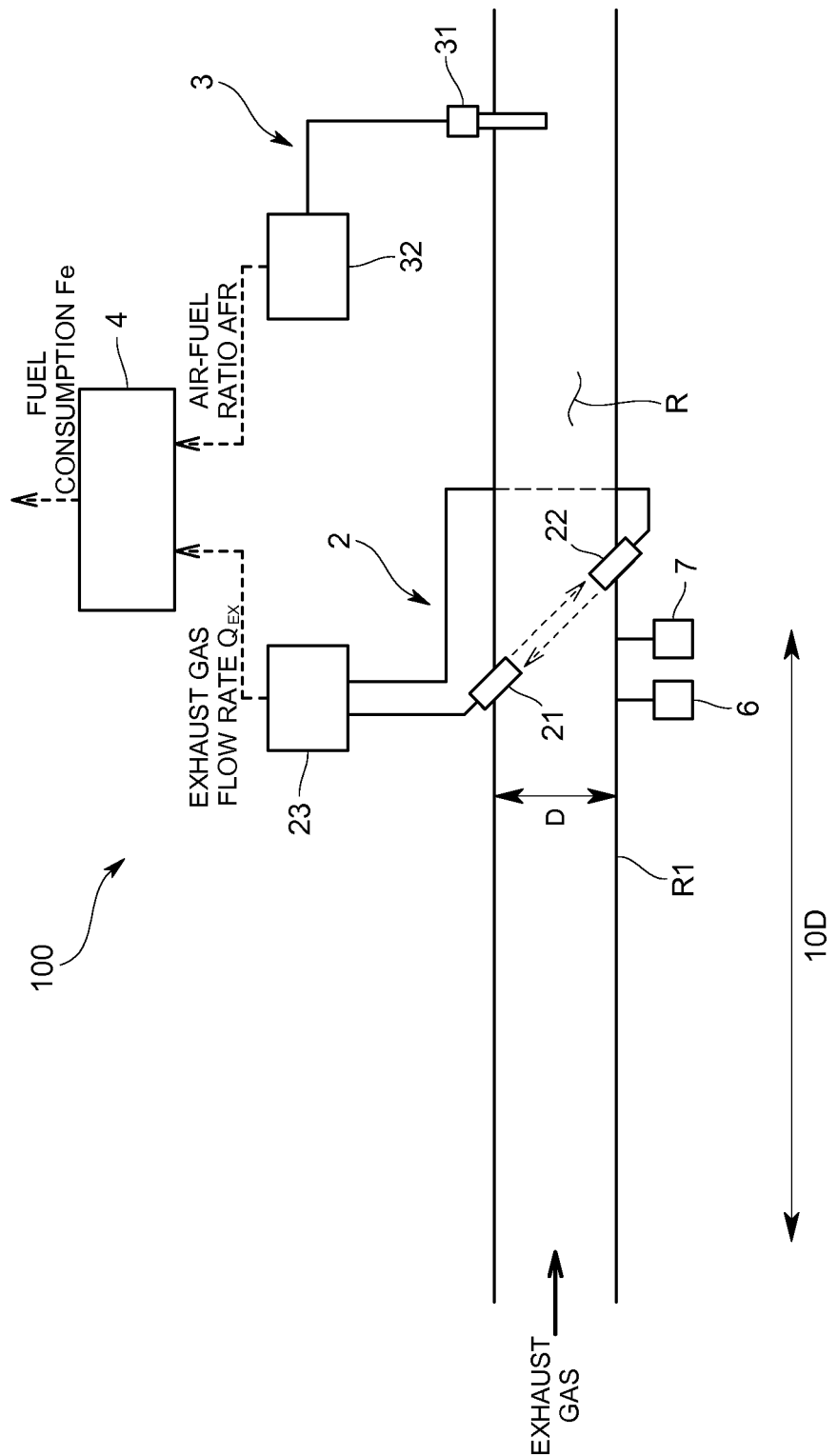
FIG. 1 is a diagram schematically illustrating a configuration of a fuel consumption measuring instrument of the present embodiment.

A fuel consumption measuring instrument 100 of the present embodiment is one that measures fuel consumption (e.g., gas mileage or a fuel consumption rate) of an engine, and as illustrated in FIG. 1, provided with: an ultrasonic flowmeter 2 that is provided in an exhaust gas flow path R for flowing exhaust gas emitted from the engine, and directly measures a flow rate QEX of the exhaust gas flowing through the exhaust gas flow path R; an air-fuel ratio sensor 3 that is provided in the exhaust gas flow path R and directly measures an air-fuel ratio AFR of the exhaust gas flowing through the exhaust gas flow path R; and an arithmetic unit 4 that calculates the fuel consumption Fe of the engine with use of the exhaust gas flow rate QEX obtained by the ultrasonic flowmeter 2 and the air-fuel ratio AFR obtained by the air-fuel ratio sensor 3.

The ultrasonic flowmeter 2 has first and second ultrasonic transceivers 21 and 22 that are arranged so as to face to each other with being tilted with respect to a flow path direction of the exhaust gas flow path R and paired. These paired ultrasonic transceivers 21 and 22 are fitted into a pipe wall of an exhaust gas circulation pipe R1 forming the exhaust gas flow path R. In addition, near the ultrasonic transceivers 21 and 22, a temperature sensor 6 that detects exhaust gas temperature, and a pressure sensor 7 that detects exhaust gas pressure are provided.

Also, the ultrasonic flowmeter 2 is provided with an operation part 23 that outputs a transmission signal to one 21 (or 22) of the ultrasonic transceivers as well as obtaining a reception signal from the other ultrasonic transceiver 22 (or 21), and thereby detects a propagation time of an ultrasonic pulse to calculate exhaust gas flow velocity and the exhaust gas flow rate. Note that a function of the operation part 23 may be provided in the after-mentioned arithmetic unit 4.

Specifically, the operation part 23 calculates the exhaust gas flow rate according to the following expression:

$$v(t) = \frac{L}{2\cos\varphi}\left(\frac{1}{T_{dn}} - \frac{1}{T_{up}}\right)$$ [Expression 1]

Here, v(t) is the exhaust gas flow velocity [m/s], Tdn is an ultrasonic wave propagation time [s] in a downstream direction, Tup is an ultrasonic wave propagation time [s] in an upstream direction, L is a distance [m] between the transceivers, and φ is an angle [°] between a flow direction and an ultrasonic wave propagation axis.

The operation part 23 uses the exhaust gas flow velocity v(t) obtained in this manner and a cross section of the exhaust gas flow path R to calculate a volumetric flow rate of the gas in a standard state according to the following expression:

$$q_{EX}(t) = k_{profile} \times A \times v(t) \times \frac{T_0}{T_{EX}(t)} \times \frac{p_{EX}(t)}{p_0}$$ [Expression 2]

Here, qEX(t) is the exhaust gas volumetric flow rate [m3/min] in the standard state at time t, kprofile a correction factor based on a velocity distribution in the exhaust gas circulation pipe R1, A the cross section [m2] of the exhaust gas circulation pipe R1, T0 the standard temperature (=293.15) [K], TEX(t) the exhaust gas temperature [K], pEX(t) the exhaust gas pressure [kPa], and p0 the standard pressure (=101.3) [kPa].

The air-fuel ratio sensor 3 is a direct insertion type sensor that is provided with being inserted into the exhaust gas flow path R, and specifically a zirconia sensor that is, on both surfaces of a zirconia (ZrO2) solid electrolyte, provided with electrodes to detect an electromotive force depending on an oxygen concentration difference between the both surface. Specifically, the air-fuel ratio sensor 3 is provided with: a sensing part 31 that incorporates the zirconia solid electrolyte, a heater for heating the electrodes and the solid electrolyte, and the like; and an operation part 32 that measures oxygen concentration in the exhaust gas from the electromotive force, and from the oxygen concentration, calculates the air-fuel ratio AFR. Note that a function of the operation part 32 may be provided in the after-mentioned arithmetic unit 4.

Figure 2:
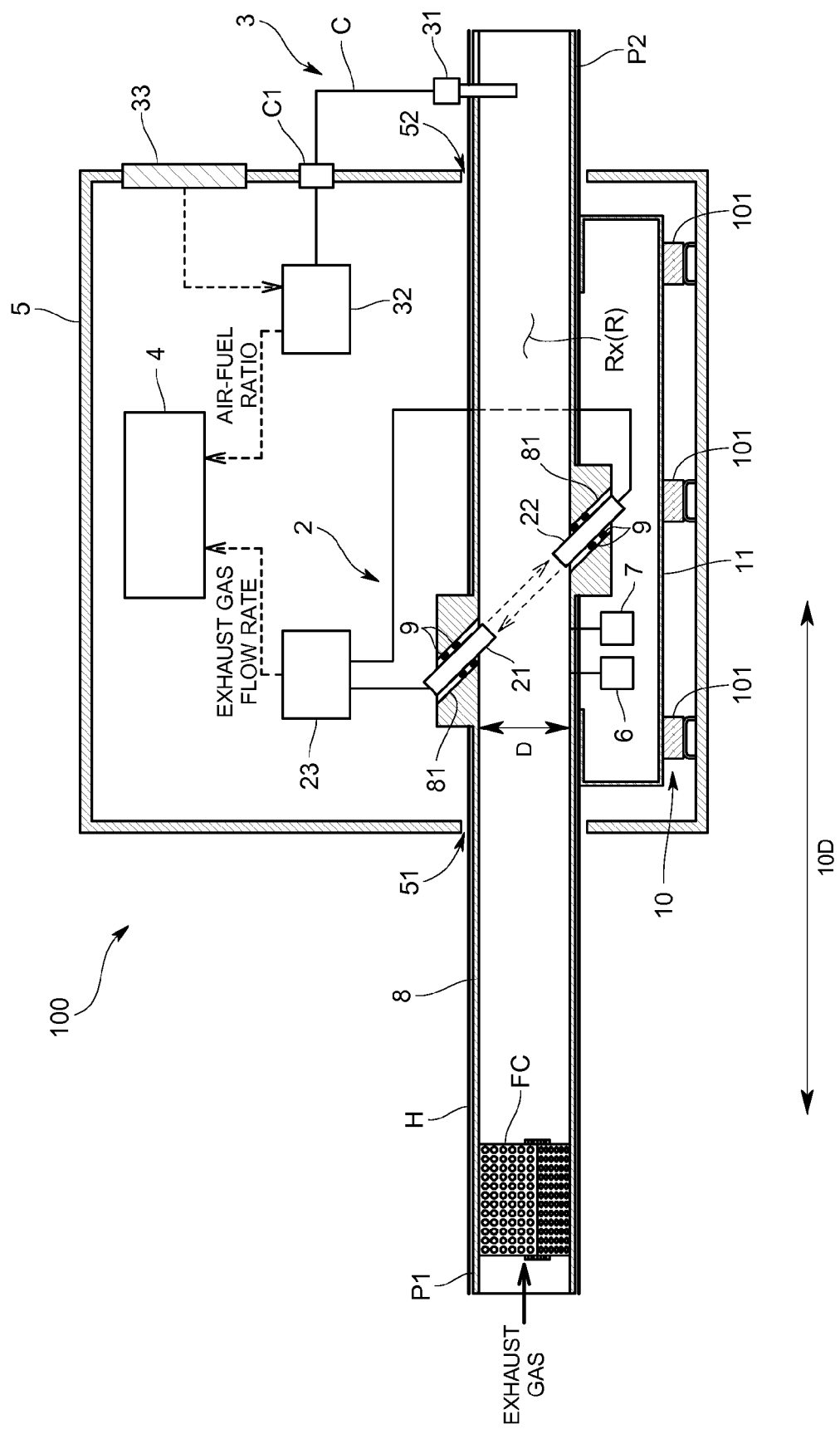
FIG. 2 is a schematic diagram illustrating a specific instrument configuration of the same embodiment.

A specific instrument configuration of the present embodiment is, as illustrated in FIG. 2, provided with: a housing 5 that is provided with an exhaust gas introduction port P1 and an exhaust gas lead-out port P2; and a measuring flow path Rx that is provided inside the housing 5 and communicatively connects the respective ports P1 and P2 to each other to form the exhaust gas flow path R.

In the present embodiment, the exhaust gas introduction port P1, exhaust gas lead-out port P2, and measuring flow path Rx are formed of, for example, a straight pipe member 8 made of stainless steel. Also, the exhaust gas introduction port P1 formed of the straight pipe member 8 is provided with extending outside from one of side walls of the housing 5, whereas the exhaust gas lead-out port P2 is provided with extending outside from the other side wall of the housing 5. Further, substantially the whole of an outer circumference of the straight pipe member 8 is provided with a heater H. The present embodiment is configured such that the heater H can perform heating so as to keep the temperature of the exhaust gas flowing through the straight pipe member 8 constant, and thereby prevent the aggregation of components contained in the exhaust gas to accurately measure the exhaust gas flow rate by the ultrasonic flowmeter 2. In addition, the exhaust gas introduction port P1 is configured to be connected with an exhaust pipe (not illustrated) connected to the engine, and receive a total amount of the exhaust gas emitted from the engine.

Also, the measuring flow path Rx inside the housing 5 is provided with the ultrasonic flowmeter 2. That is, the ultrasonic flowmeter 2 is contained inside the housing 5. Specifically, inside the housing 5, the ultrasonic transceivers 21 and 22 of the ultrasonic flowmeter 2 are inserted into and fixed in a side wall of the straight pipe member 8. In detail, the side wall of the straight pipe 8 is formed with insertion holes 81 for inserting the ultrasonic transceivers 21 and 22, and the ultrasonic transceivers 21 and 22 are fixed in the insertion holes through resin-made insulating members 9 having insulation properties, such as O-rings. That is, between outer circumferential surfaces of the ultrasonic transceivers 21 and 22 and inner circumferential surfaces of the insertion holes 81, the insulating members 9 are positioned. This enables the ultrasonic transceivers 21 and 22 and the straight pipe member 8 to be insulated from each other to prevent electrical noise from being transmitted from the straight pipe member 8 to the ultrasonic transceivers 21 and 22, and a measurement error due to the electrical noise to be reduced.

Also, on an upstream side of the ultrasonic flowmeter 2 in the exhaust gas flow path R, a flow conditioner FC is provided. Specifically, at the exhaust gas introduction port P1, or in a predetermined range near the exhaust gas introduction port P1, the flow conditioner FC is provided. The flow conditioner FC is one that straightens a flow of the exhaust gas flowing into the ultrasonic flowmeter 2 to eliminate disturbance of the flow velocity distribution of the exhaust gas flowing into the ultrasonic flowmeter 2. By providing the flow conditioner FC, the exhaust gas flow rate can be accurately measured.

Figure 3:
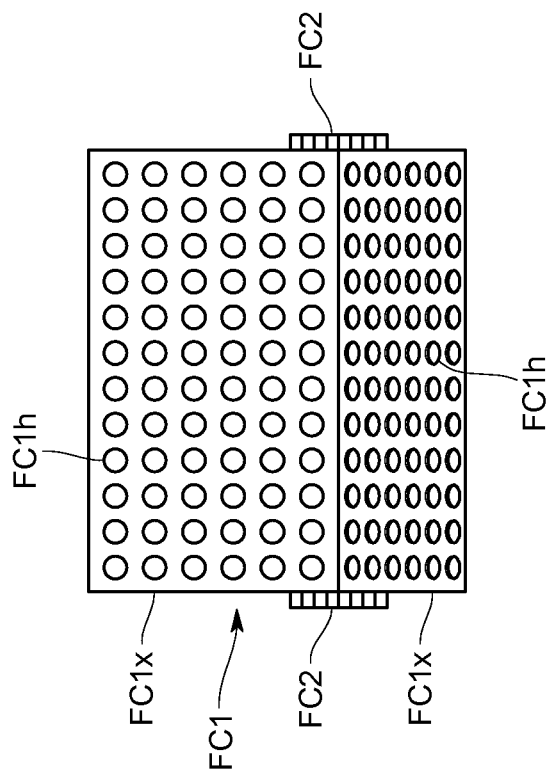
FIG. 3 includes front and side views illustrating a configuration of a flow conditioner of the same embodiment.
Figure 3:
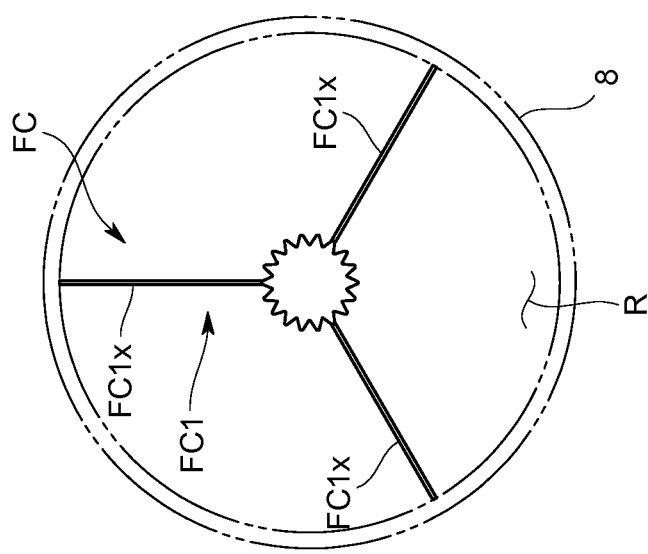

The flow conditioner FC is, as illustrated in FIG. 3, provided with: a main body FC1 having a plurality of vanes FC1x that divide the exhaust gas flow path R into a plurality of paths along a circumferential direction; and end surface plates FC2 that are respectively provided on both end surfaces of the main body FC1.

The main body FC1 has the plurality of vanes FC1x in the circumferential direction at regular intervals. The main body FC1 of the present embodiment is configured by connecting one side part of the plurality of vanes FC1x to one another. Also, each of the vanes FC1x is formed in a substantially rectangular shape, and formed with a plurality of through-holes FC1h.

The end surface plates FC2 are ones that are provided on the both end surfaces (upstream side end surface and downstream side end surface) of the main body FC1 and respectively formed in substantially circular shapes. Each of the end surface plates FC2 of the present embodiment is, in a circumferential part thereof, along a circumferential direction, formed with an uneven shape regularly, for example, in a triangular wave manner.

Also, the exhaust gas lead-out port P2 is provided with the air-fuel ratio sensor 3. Specifically, the sensing part 31 of the air-fuel ratio sensor 3 is provided with being inserted inside the exhaust gas flow path R from a pipe wall of the exhaust gas lead-out port P2. On the other hand, the operation part 32 of the air-fuel ratio sensor 3 is contained inside the housing 5. Further, a cable C extending from the sensing part 31 is connected to a connecting connector C1 for connecting to the operation part 32 contained in the housing 5. The connecting connector C1 is provided in the side wall of the housing 5. As described, the air-fuel ratio sensor 3 is provided outside the housing 5 and configured to be attachable/detachable with the connecting connector C1, and therefore replacement work on the air-fuel ratio sensor 3 can be easily done. Also, in the side wall of the housing 5, an input part 33 for inputting setting parameters for the air-fuel ratio sensor 3, such as an input panel, is provided. The setting parameters include, for example, a sensor constant determined for each air-fuel ratio sensor, and other parameters necessary for the air-fuel ratio measurement. The input part 33 is provided in the side wall of the housing 5, and therefore after the air-fuel ratio sensor 3 has been placed or replaced, the setting parameters for the air-fuel ratio sensor 3 can be inputted on site. That is, the replacement work on the air-fuel ratio sensor 3, and setting parameter input work on the air-fuel ratio sensor 3 can be done at the same place to improve user-friendliness.

Note that the ultrasonic flowmeter 2 is provided in the measuring flow path Rx and the air-fuel ratio sensor 3 is provided at the exhaust gas lead-out port P2, so that the ultrasonic flowmeter 2 and the air-fuel ratio sensor 3 are provided in the exhaust gas flow path R at a short distance equivalent to substantially the same position, and consequently provided within a range where a time lag in measurement between the ultrasonic flowmeter 2 and the air-fuel ratio sensor 3 does not occur and the composition of the exhaust gas does not change. That is, an air-fuel sensor (not illustrated) is also provided near an exhaust gas outlet of the engine of a vehicle, and a value of the sensor can be used to calculate fuel consumption; however, in this case, on a downstream side of the engine, a catalyst and the like are present to cause the accumulation of the exhaust gas, and therefore between the exhaust gas flow rate value obtained by measuring the exhaust gas emitted from a tail pipe by the ultrasonic flowmeter 2 and an air-fuel ratio measured using the air-fuel ratio sensor inside the vehicle, a time lag occurs. For this reason, in the present embodiment, by providing the air-fuel ratio sensor 3 near the ultrasonic flowmeter 2, a measurement error due to the occurrence of the time lag can be eliminated to obtain accurate instantaneous fuel consumption. Further, in the present embodiment, on a downstream side of the ultrasonic flowmeter 2, i.e., at the exhaust gas lead-out port P2, providing the air-fuel ratio sensor 3 is preferable. This is because, in the case of providing the air-fuel ratio sensor 3 on an upstream side of the ultrasonic flowmeter 2, i.e., at the exhaust gas introduction port P1, the air-fuel ratio sensor 3 serves as a resistor to give rise to disturbance in the flow velocity distribution of the exhaust gas, which becomes an error factor of a measured value of the ultrasonic flowmeter 2. By providing the air-fuel ratio sensor 3 on the downstream side of the ultrasonic flowmeter 2, without the occurrence of such unevenness in flow velocity, the exhaust gas flow rate can be accurately measured. Further preferably, given that a flow path diameter of the exhaust gas flow path R is D, it is preferable to, on the upstream side of the ultrasonic flowmeter 2, provide a straight pipe having a distance (length) of 10D (ten times D) or more. This is because, in the case of providing a curved pipe in a position that is on the upstream side of and close to the ultrasonic flowmeter 2, unevenness occurs in the flow velocity distribution, which becomes an error factor of a measured value of the ultrasonic flowmeter 2. In addition, the straight pipe is formed of the straight pipe member 8.

Further, inside the housing 5, the arithmetic unit 4 is contained. The arithmetic unit 4 is a dedicated or general-purpose computer provided with a CPU, a memory, an input/output interface, an AD converter, and the like.

The arithmetic unit 4 is one that, with use of the exhaust gas flow rate QEX obtained by the ultrasonic flowmeter 2 and the air-fuel ratio AFR obtained by the air-fuel ratio sensor 3, calculates the instantaneous fuel consumption Fe(t) according to the following expression:

$$Fe(t) = \frac{Q_{EX}(t)}{60} \times D_{EX} \times \frac{1}{AFR(t)+1} \qquad \text{[Expression 3]}$$

Here, Fe(t) is the fuel consumption [g/s] at time t, QEX(t) the exhaust gas flow rate [L/min] at the time t in the standard state (temperature of 293.15 K and pressure of 101.3 kPa), AFR(t) the air-fuel ratio at the time t, and DEX the density of the exhaust gas [kg/m3].

In addition, the arithmetic unit 4 displays the instantaneous fuel consumption Fe(t) calculated according to the above expression on a display part (not illustrated) provided on the housing 5. Alternatively, the present invention may have an output part such as a part printing the instantaneous fuel consumption Fe(t) obtained by the arithmetic unit 4 on a print sheet.

Further, in the present embodiment, the straight pipe member 8 is fitted into the housing 5 through an antivibration mechanism 10. Specifically, between a supporting member 11, which supports the straight pipe member 8 from below, and the housing 5, the antivibration mechanism 10 is provided. The antivibration mechanism 10 is configured to include antivibration rubbers 101 that are provided between a lower surface of the supporting member 11 and a bottom surface of the housing 5. Even in the case where the straight pipe member 8 is vibrated in response to vibration from the exhaust pipe, the antivibration rubbers 101 make it difficult for the vibration to be transmitted to the housing 5. This enables an influence of the vibration on devices such as arithmetic processing units (e.g., the operation part 23, operation part 32, and arithmetic unit 4) installed in the housing 5 to be reduced. Also, the straight pipe member 8 is vibrated as a whole in response to the vibration of the exhaust pipe, so that a relative positional relationship between the ultrasonic transceivers 21 and 22 of the ultrasonic flowmeter 2 provided through the straight pipe member 8 is not changed, and therefore a measurement error of the exhaust gas flow rate can be suppressed.

Note that according to the above-described configuration, the straight pipe member 8 is configured to be vibrated together with the exhaust pipe, and therefore to prevent the straight pipe member 8 from coming into contact with each of side wall opening parts 51 and 52 of the housing 5 due to the vibration, opening diameters of the side wall opening parts 51 and 52 of the housing 5 are made larger than an outside diameter of the straight pipe member 8.

Further, the antivibration rubbers 101 fulfill an insulating function between the housing 5 and the straight pipe member 8, so that electrical noise can be prevented from being transmitted from the housing 5 to the ultrasonic transceivers 21 and 22 through the straight pipe member 8, and therefore a measurement error due to the electrical noise can be reduced.

Figure 4:
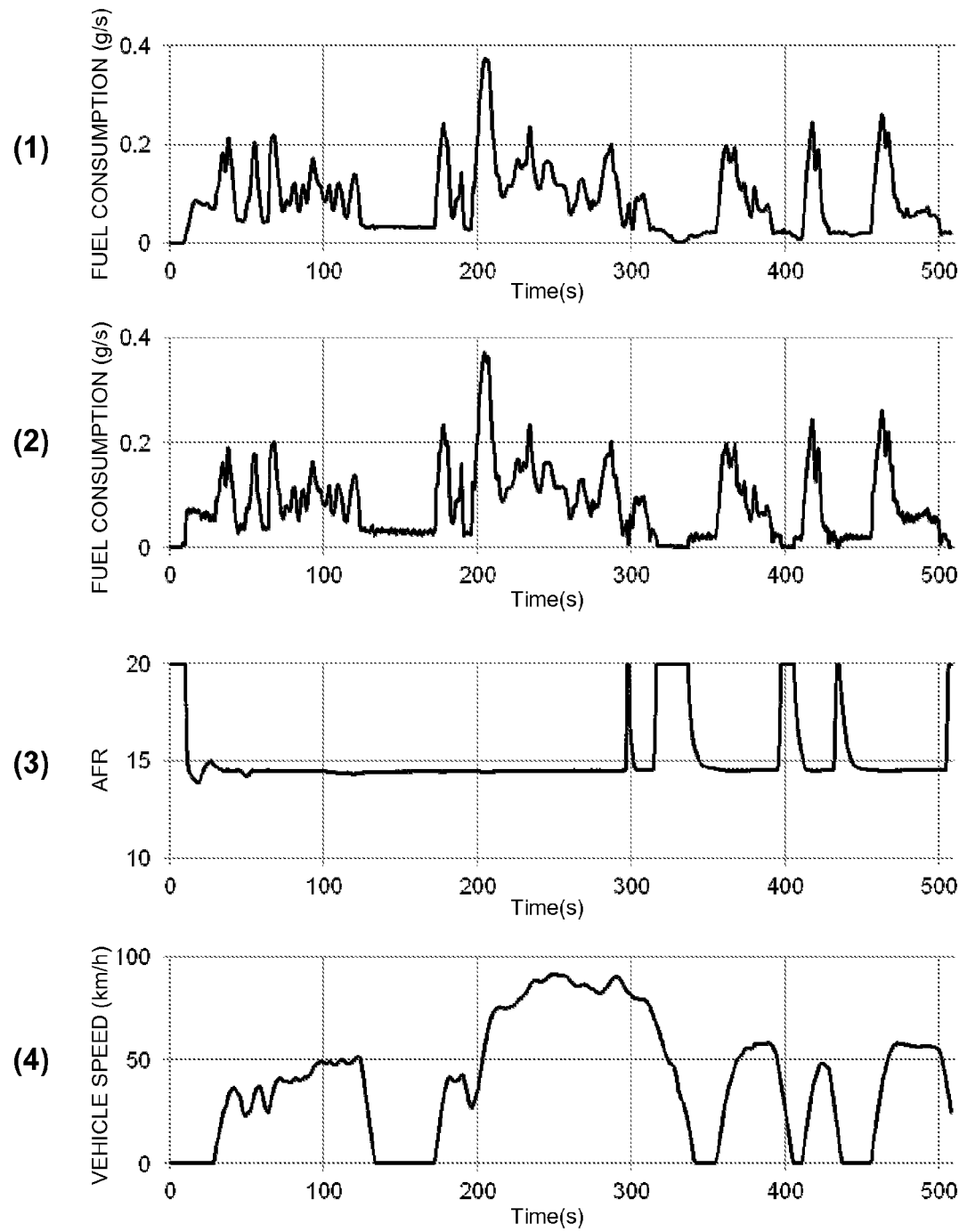
FIG. 4 is a diagram illustrating results of real-time measurement by the fuel consumption measuring instrument of the present embodiment and real-time measurement by a dilute stream method, and the like (in the case of the cold start phase)
Figure 5:
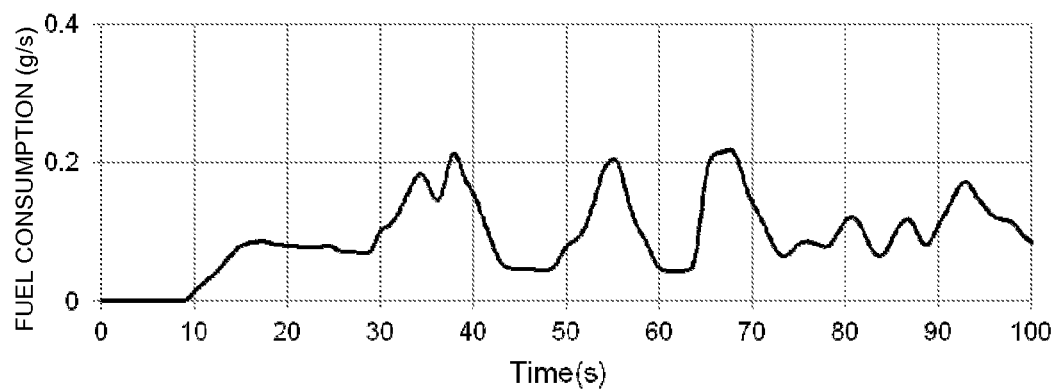
FIG. 5 is a diagram illustrating measurement results of fuel consumption from 0 to 100 seconds by the real-time measurement by the fuel consumption measuring instrument of the present embodiment and by the real-time measurement by the dilute stream method (in the case of the cold start phase)
Figure 5:
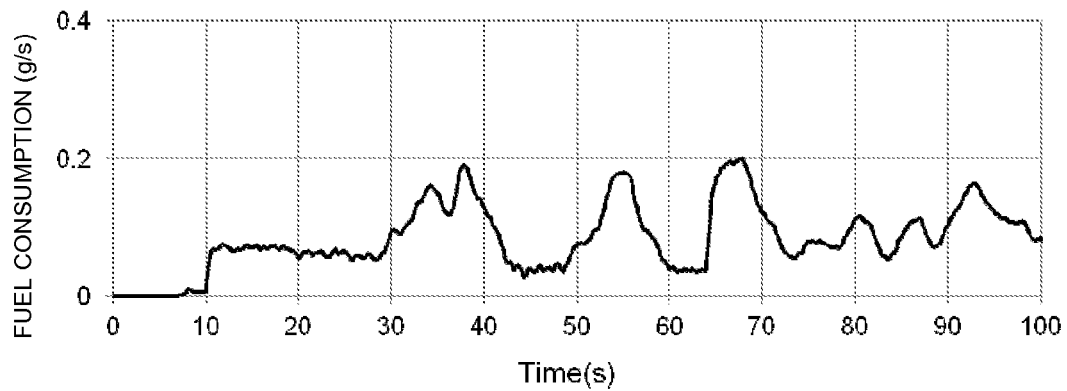

Next, at the cold start phase of the FTP-75 cycle, a result of real-time measurement using the fuel consumption measuring instrument 100 of the present embodiment, and a result of real-time measurement that obtains an exhaust gas flow rate by a dilute stream method, and uses a value of the exhaust gas flow rate to obtain fuel consumption by a carbon balance method are illustrated in FIGS. 4 and 5. In addition, the dilute stream method refers to a measuring technique that, from concentration of gas diluted by a CVS and a flow rate after the dilution, obtains exhaust gas weight (flow rate), and from the exhaust gas flow rate obtained by using the dilute stream method, and concentration values of respective components obtained by using an exhaust gas analyzer to continuously measure the exhaust gas diluted by the CVS, the fuel consumption is obtained by using the carbon balance method.

FIG. 4(1) illustrates the measurement result using the dilute stream method (conventional method), FIG. 4(2) illustrates the measurement result using the fuel consumption measuring instrument of the present embodiment, FIG. 4(3) illustrates an AFR obtained by an air-fuel ratio meter, and FIG. 4(4) illustrates vehicle speed. Also, FIG. 5(1) illustrates the measurement result of the fuel consumption from 0 to 100 seconds by the conventional method, and FIG. 5(2) illustrates the measurement result of the fuel consumption from 0 to 100 seconds in the present embodiment.

As can be seen from FIG. 5(1), in the case of the dilute stream method, it turns out that at the time of a small flow rate immediately after the start, a gas delay is noticeable, and a rise in fuel consumption is blunt. On the other hand, as can be seen from FIG. 5(2), in the case of the fuel consumption measuring instrument of the present embodiment, it turns out that even at the time of a small flow rate immediately after the start, a rise is sharp, and a response delay is reduced. Also, at the time of a fuel cut, the fuel consumption rate is supposed to be almost zero; however, in the case of the dilute stream method, it turns out that a response delay appears (see FIG. 4(1)). On the other hand, in the case of the fuel consumption measuring instrument of the present embodiment, it turns out that almost simultaneously with the time of a fuel cut, the fuel consumption rate becomes almost zero (see FIG. 4(2)).

Figure 6:
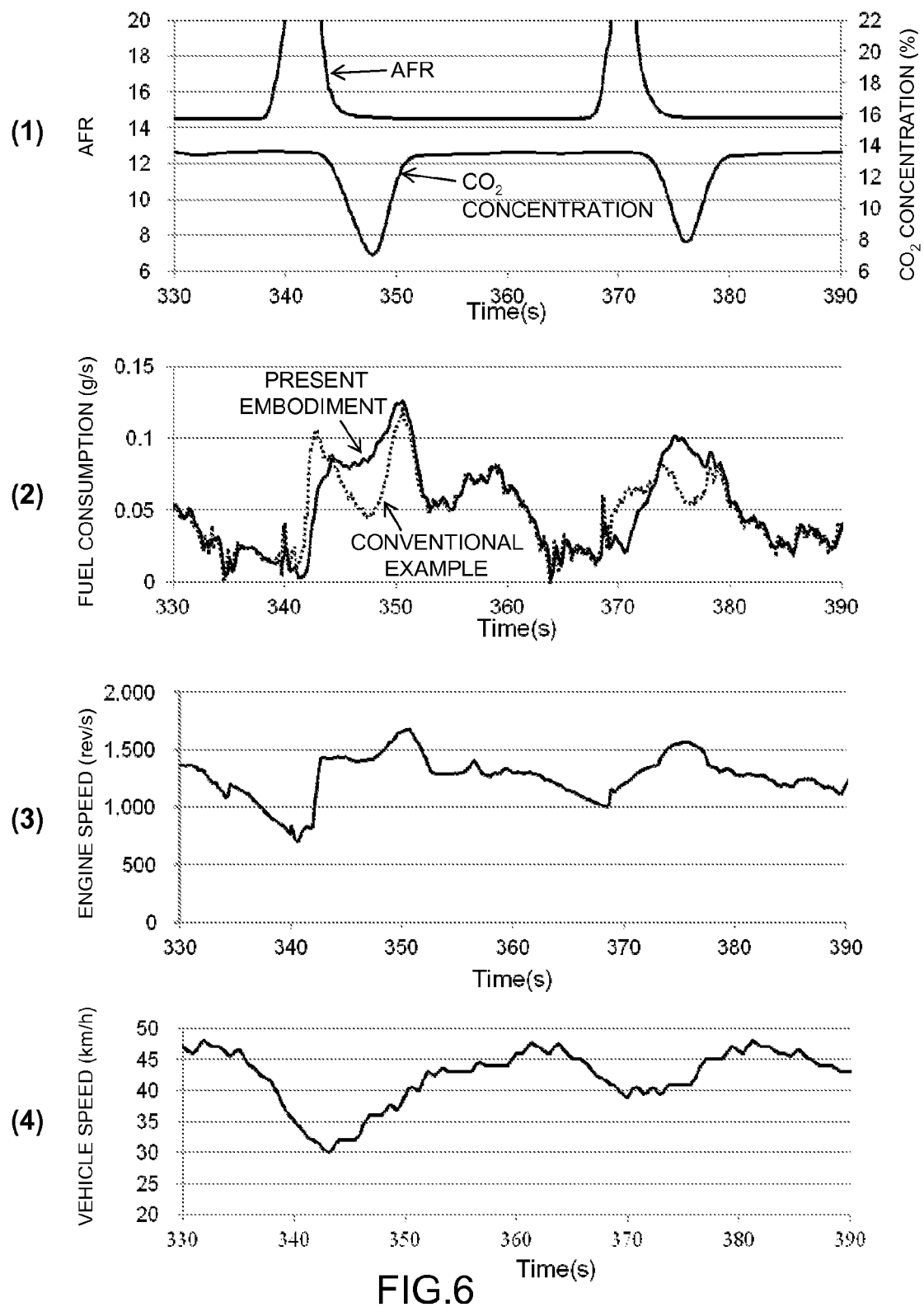
FIG. 6 is a diagram illustrating results of the real-time measurement by the fuel consumption measuring instrument of the present embodiment and the real-time measurement by the dilute stream method, and the like (in the case of rapid acceleration immediately after a fuel cut in the transient phase)

Next, a result of real-time measurement using the fuel consumption measuring instrument of the present embodiment and a result of real-time measurement by the dilute stream method (conventional method) in the case of rapid acceleration immediately after a fuel cut at the transient phase of the FTP-75 cycle are illustrated in FIG. 6.

FIG. 6(1) illustrates an AFR obtained by an air-fuel ratio meter, and CO2 concentration that is contained in exhaust gas before dilution by a CVS and obtained by a CO2 meter, FIG. 6(2) illustrates the measurement result using the fuel consumption measuring instrument of the present embodiment, and the measurement result obtained by obtaining an exhaust gas flow rate by the dilute stream method, and using a value of the exhaust gas flow rate to obtain fuel consumption by the carbon balance method, FIG. 6(3) illustrates engine speed [rpm], and FIG. 6(4) illustrates vehicle speed.

FIG. 6 shows that in the calculation of the fuel consumption by the carbon balance method, the contribution of CO2 weight is very high, and consequently the CO2 concentration exerts a large influence. That is, referring to the AFR in FIG. 6(1), when a fuel cut is performed at the time of deceleration, the AFR rapidly rises to exhibit a lean state. When the engine speed and vehicle speed start to rise, the fuel cut is stopped, and the AFR returns to a stoichiometric (theoretical air-fuel ratio) state. In the case of the dilute stream method, even though the fuel cut is stopped to start acceleration, due to a gas delay, the CO2 concentration remains reduced. For this reason, an influence of the gas response delay appears in the instantaneous fuel consumption, and a difference appears with respect to the fuel consumption measuring instrument of the present embodiment. Also, in the case of comparing the fuel consumption measuring instrument of the present embodiment and the dilute stream method with each other, the fuel consumption measuring instrument of the present embodiment can more accurately measure the instantaneous fuel consumption.

The fuel consumption measuring instrument 100 according to the present embodiment configured as described is one that directly and simultaneously measures the flow rate and air-fuel ratio of the exhaust gas flowing through the exhaust gas flow path R by the ultrasonic flowmeter 2 and air-fuel ratio sensor 3; can eliminate a response delay that has conventionally been caused by providing a sampling flow path; and also has no need to take into account a difference in delay time or response speed between the respective sensors 2 and 3. This enables the fuel consumption of the engine to be measured at high response speed and with high accuracy. Also, because of using the ultrasonic flowmeter 2, pressure loss due to providing the ultrasonic flowmeter 2 is not present; measurement accuracy is high over a range from a small flow rate to a large flow rate; and there is also less influence on pulsation. This also enables the fuel consumption to be measured with high accuracy. Further, because of the direct measurement, a piping configuration can be simplified by eliminating the need for the conventional sampling flow path, and also because a dilution device such as a CVS becomes unnecessary, the measuring instrument can be downsized. In addition, for these reasons, instrument cost can also be reduced.

Note that the present invention is not limited to the above-described embodiment.

For example, in the above-described embodiment, the air-fuel ratio sensor is provided at the exhaust gas lead-out port of the housing, which is on the downstream side of the ultrasonic flowmeter; however, the air-fuel ratio sensor may be provided on the upstream side of the ultrasonic flowmeter, such as at the exhaust gas introduction port of the housing. Also, the present invention may be adapted such that the arithmetic unit 4 receives a signal from the air-fuel ratio sensor provided near the engine exhaust outlet of the vehicle and calculates fuel consumption.

Further, in the above-described embodiment, the arithmetic unit 4 is provided in the housing 5; however, the present invention may be adapted such that the arithmetic unit 4 is provided outside the housing 5. In this case, it is possible to, inside the housing 5, provide a wired or wireless transceiver device that transceives data with the arithmetic unit 4 provided outside. For example, the transceiver device transmits a detection signal of the ultrasonic flowmeter and a detection signal of the air-fuel ratio sensor to the arithmetic unit 4.

Also, the fuel consumption measuring instrument of the above-described embodiment is unitized in the housing; however, the fuel consumption measuring instrument may be one that is not unitized.

Figure 7:
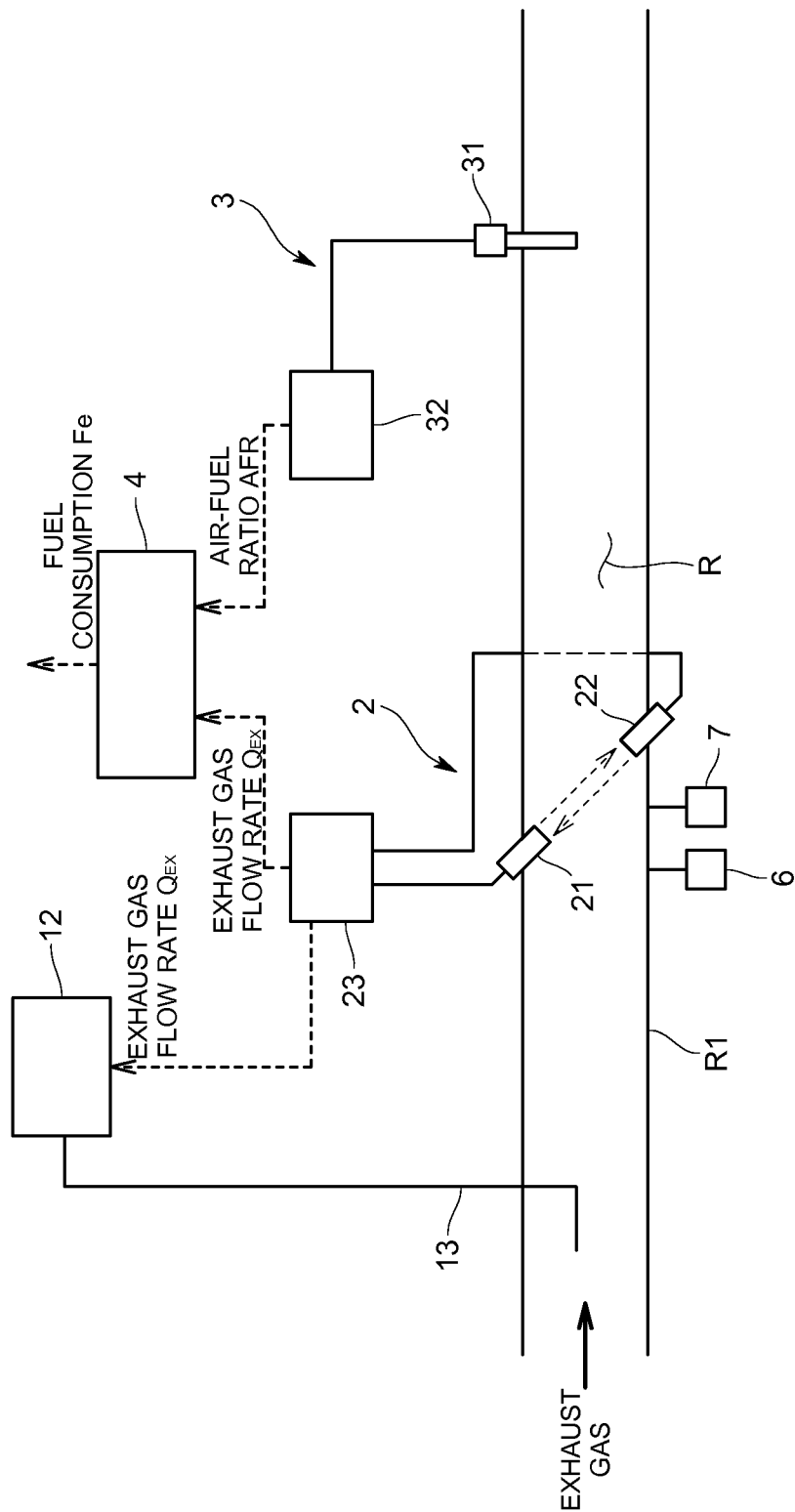
FIG. 7 is a diagram schematically illustrating a configuration of a fuel consumption measuring instrument of a variation.

Further, the above-described fuel consumption measuring instrument 100 may be, as illustrated in FIG. 7, one that is provided with an exhaust gas analyzer 12 that analyzes a predetermined measuring target component contained in the exhaust gas flowing through the exhaust gas flow path R. In addition, an operation part of the exhaust gas analyzer 12 uses obtained concentration of the component, and an exhaust gas flow rate obtained by the ultrasonic flowmeter 2 to calculate emission mass of the measuring target component. If so, the ultrasonic flowmeter 2 can be used for both of the fuel consumption measurement and the emission mass measurement (mass measurement). In addition, not the operation part of the exhaust gas analyzer 12, but the arithmetic unit 4 of the fuel consumption measuring instrument 100 may use the component concentration obtained by the exhaust gas analyzer 12 and the exhaust gas flow rate obtained by the ultrasonic flowmeter 2 to calculate the emission mass of the measuring target component.

It is desirable for the exhaust gas analyzer 12 to measure the measuring target component contained in the exhaust gas flowing on the upstream side of the ultrasonic flowmeter 2 in the exhaust gas flow path R. Specifically, a sampling pipe 13 that collects part of the exhaust gas flowing through the exhaust gas flow path R to introduce the part into the exhaust gas analyzer 12 is connected to the upstream side of the ultrasonic flowmeter 2. In addition, in the case of a configuration that uses the sampling pipe 13 to sample the exhaust gas, the arithmetic unit 4 uses a sampling flow rate of the part flowing through the sampling pipe 13 to correct the exhaust gas flow rate obtained by the ultrasonic flowmeter 2.

Besides, it should be appreciated that the present invention is not limited to the above-described embodiment, but can be variously modified without departing from the scope thereof.

What is claimed is:

1. A fuel consumption measuring instrument that measures fuel consumption of an engine, the fuel consumption measuring instrument comprising:
   an ultrasonic flowmeter that is provided in an exhaust gas flow path through which exhaust gas emitted from the engine flows, and measures a flow rate of the exhaust gas flowing through the exhaust gas flow path; and
   an arithmetic unit that is configured to calculate the fuel consumption of the engine with use of the exhaust gas flow rate obtained by the ultrasonic flowmeter, and an air-fuel ratio obtained by an air-fuel ratio sensor that is provided in the exhaust gas flow path and measures the air-fuel ratio of the exhaust gas flowing through the exhaust gas flow path.

2. The fuel consumption measuring instrument according to claim 1, wherein
   the air-fuel ratio sensor is provided on a downstream side of the ultrasonic flowmeter in the exhaust gas flow path.

3. The fuel consumption measuring instrument according to claim 1, wherein
   on an upstream side of the ultrasonic flowmeter in the exhaust gas flow path, a flow conditioner is provided.

4. The fuel consumption measuring instrument according to claim 1, wherein
   the air-fuel ratio sensor is a direct insertion type zirconia sensor that is provided with being inserted into the exhaust gas flow path.

5. The fuel consumption measuring instrument according to claim 1, wherein
   an upstream side of the ultrasonic flowmeter in the exhaust gas flow path is formed of a straight pipe, and the straight pipe has a length ten times or more a flow path diameter of a flow path part where the ultrasonic flowmeter is provided.

6. The fuel consumption measuring instrument according to claim 4, wherein
the straight pipe is provided with a heater.

7. The fuel consumption measuring instrument according to claim 1, comprising:
a housing that is provided with an exhaust gas introduction port and an exhaust gas lead-out port; and
a measuring flow path that is provided inside the housing and communicatively connected to the respective ports to form the exhaust gas flow path, wherein:
the measuring flow path is provided with the ultrasonic flowmeter; and
the exhaust gas introduction port or the exhaust gas lead-out port is provided with the air-fuel ratio sensor.

8. The fuel consumption measuring instrument according to claim 7, wherein
the housing is provided with an input part for inputting a setting parameter for the air-fuel ratio sensor.

9. The fuel consumption measuring instrument according to claim 7, wherein
the exhaust gas introduction port, the exhaust gas lead-out port, and the measuring flow path are formed of a straight pipe member, and the straight pipe member is fitted into the housing through an antivibration mechanism.

10. The fuel consumption measuring instrument according to claim 9, wherein
a side wall of the straight pipe member is formed with an insertion hole into which an ultrasonic transceiver of the ultrasonic flowmeter is inserted, and the ultrasonic transceiver is fixed in the insertion hole through an insulating member.

11. The fuel consumption measuring instrument according to claim 1, comprising
an exhaust gas analyzer that is configured to analyze a predetermined measuring target component contained in the exhaust gas flowing through the exhaust gas flow path, wherein
an operation part of the exhaust gas analyzer or the arithmetic unit is configured to calculate emission mass of the measuring target component with use of component concentration obtained by the exhaust gas analyzer and the exhaust gas flow rate obtained by the ultrasonic flowmeter.

12. The fuel consumption measuring instrument according to claim 11, wherein
the exhaust gas analyzer is configured to measure the measuring target component contained in the exhaust gas flowing on an upstream side of the ultrasonic flowmeter in the exhaust gas flow path.

13. The fuel consumption measuring instrument according to claim 12, having
a sampling pipe that is configured to collect part of the exhaust gas flowing on the upstream side of the ultrasonic flowmeter in the exhaust gas flow path and is configured to introduce the part into the exhaust gas analyzer, wherein
a sampling flow rate of the part flowing through the sampling pipe is used to correct the exhaust gas flow rate obtained by the ultrasonic flowmeter.

* * * * *